May 23, 1933.   L. SICHEL   1,910,266
AUTOMATIC LEVEL
Filed Oct. 2, 1929
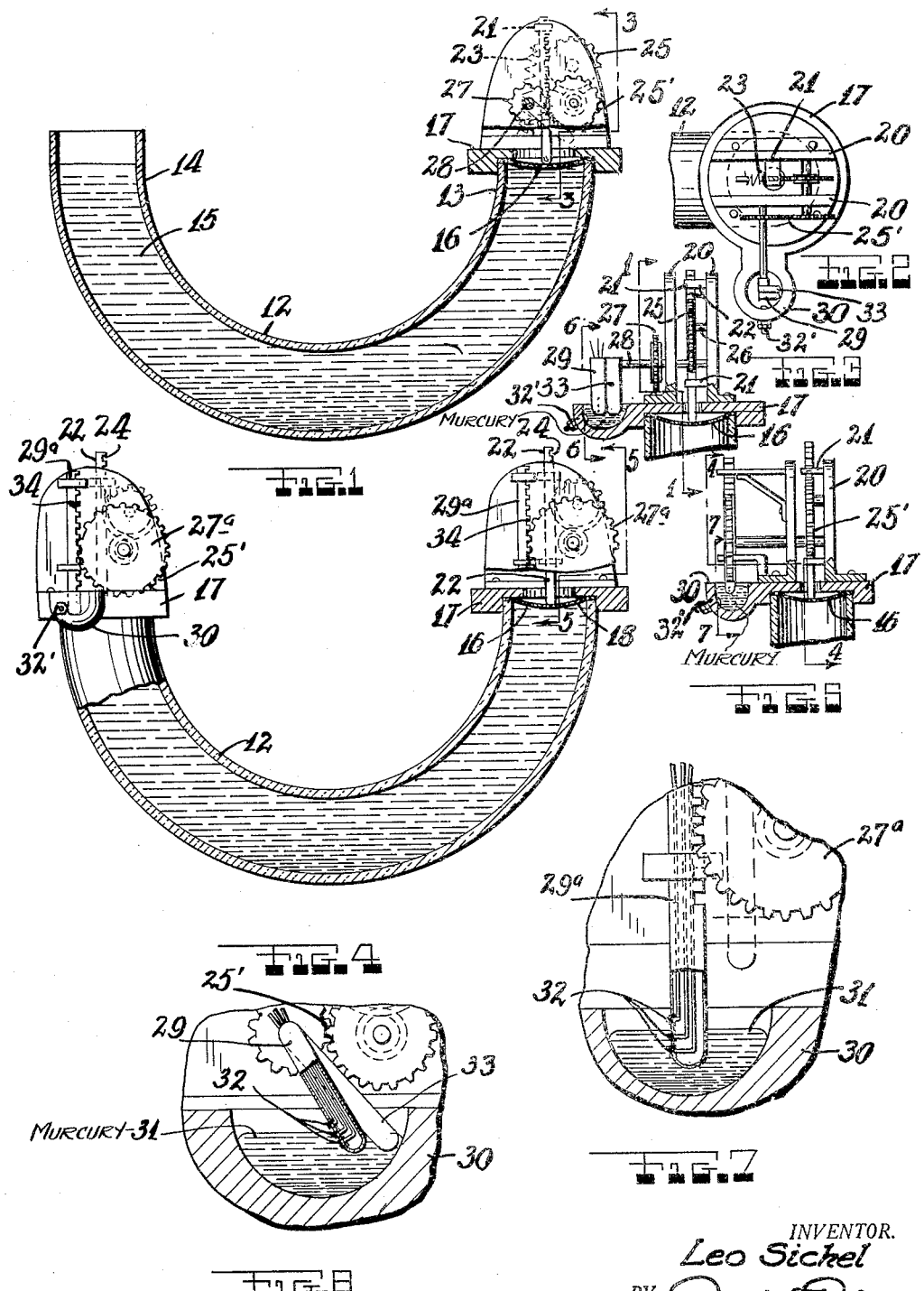
INVENTOR.
Leo Sichel
BY
ATTORNEY Patented May 23, 1933

1,910,266

UNITED STATES PATENT OFFICE

LEO SICHEL, OF ST. GEORGE, NEW YORK

AUTOMATIC LEVEL

Application filed October 2, 1929. Serial No. 396,604.

This invention relates to new and useful improvements in an electrically operated automatic level.

The invention has for an object the provision of a device of the class mentioned which is of simple durable construction, dependable in use and efficient in action, and which can be manufactured and sold at a reasonable cost.

The invention proposes a bent tube with a pair of upwardly directed arms containing a liquid free to move under the action of gravity upon tilting of the tube, a diaphragm supported on the tube and in contact with the liquid, mechanical means for multiplying movements of the diaphragm, and means for controlling the circuit with the multiplied movements.

The invention also proposes the application of the electrically operated automatic level to a machine table or other object for maintaining preadjusted positions, leveling and the like.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a vertical sectional view of a level constructed according to this invention, and taken on the line 1—1 of Fig. 3.

Fig. 2 is a fragmentary plan view of a portion of the device shown in Fig. 1.

Fig. 3 is a fragmentary sectional view taken on the line 3—3 of Fig. 1.

Fig. 4 is a view similar to Fig. 1 but of modified form, taken on the line 4—4 of Fig. 5.

Fig. 5 is a fragmentary sectional view taken on the line 5—5 of Fig. 4.

Fig. 6 is an enlarged detailed sectional view taken on the line 6—6 of Fig. 3.

Fig. 7 is a sectional view taken on the line 7—7 of Fig. 5.

The electrically operated automatic level consists of a bent tube 12 with a pair of arms 13 and 14 directed upwards and containing a liquid 15 free to move under the action of gravity upon tilting of the tube, a diaphragm 16 supported on the tube and in contact with the liquid, mechanical means for multiplying movements of the diaphragm, and means for controlling a circuit with the multiplied movements. The essential feature of this invention is that the liquid pressure on the diaphragm resulting in a movement of the latter element is made use of to obtain by mechanical means an enormously increased movement of an electrical contact for the control of the said circuit.

The said bent tube 12 is preferably made of glass and of arcuate shape. In lieu of a tube, the element 12 may be a vessel of any shape whatsoever provided that it has two upwardly projecting arms connected for the passage of liquid from one to the other so that upon tilting the liquid seeks a level. The said liquid 15 may be oil, glycerine, mercury or the like.

The said diaphragm 16 may be of rubber, sheet metal etc. and is supported upon one end of the tube by a flange 17 firmly attached upon the tube. This flange is formed with a recess 18 into which a portion of the tube extends.

The said mechanical means for multiplying movements of the diaphragm consists of spaced vertical plates 20 secured upon the flange 17. Lugs 21 project from one of the plates and slidably support a rack pin 22 urged against the diaphragm by a tension spring 23. The rack pin 22 is formed with rack teeth 24 meshing with a gear 25 on a stud shaft 26 supported on one of the plates. This gear connects with a train of gears 25' arranged for stepping up movements and the last gear of this train namely gear 27 is fixed upon a shaft 28 rotatively supported in the plates 20 and carrying a radial contact finger 29.

The said means for controlling a circuit with the multiplied movements consists of a tray 30 filled with a liquid 31 having electrical conducting qualities and constituting a terminal for connection in a circuit with a relay, switch, battery, or direct to electric motors which operate automatic leveling means by any suitable apparatus. The said contact finger 29 is provided with a plurality of contacts 32 along its length arranged for connecting a rheostat for the control of the said apparatus. The greater the depth to which the finger engages within the liquid, the greater the number of contacts in the circuit and the larger the flow of current. A terminal post 32' may be supported on tray 30 and connected to the mercury 31 in the said tray.

A damping lever 33 is fixed upon the shaft 28 and slightly lags behind the radial finger 29. It has been found that as the radial finger moves downwards it cannot at first break thru the surface of the liquid due to the skin, but after breaking thru it rapidly descends and the damp arm 33 now comes into play for restraining rapid moving downwards of the finger.

In the modified form of the device illustrated in Figs. 4, 5 and 7, both ends of the tube 12 are provided with diaphragms and mechanical means for multiplying movements of the diaphragms and means for controlling a circuit with the multiplied movements. This apparatus is identical at both ends. It is slightly of modified form relative to the one disclosed in Figs. 1, 2 and 3, differing mainly in that it is provided with a contact finger 29ª arranged for longitudinal movements in lieu of radial movements. This contact finger 29ª is provided with rack teeth 34 meshing with the teeth of the last gear 27ª of the train of gears which connects with the rack pin 22. Contact finger 29ª is provided with a plurality of contacts 32 for the purpose previously mentioned.

It is to be understood that while I have described a train of gears to be the means of magnifying the initial movement produced by the diaphragm 16 any other means known in the mechanical art may be used, such as levers, eccentrics, etc.

While I have shown and described the preferred embodiment of my invention, it is to be understood that I do not limit myself to the precise construction herein disclosed and the right is reserved to all changes and modifications coming within the scope of the invention as defined in the appended claims.

Having thus descibed my invention, what I claim as new, and desire to secure by United States Letters Patent is:—

1. An electrically operated automatic level, comprising a bent tube with a pair of upwardly directed arms, a liquid in said arms free to move under the action of gravity upon tilting of the tube, a diaphragm supported on the tube and in contact with the liquid, mechanical means for multiplying movements of the diaphragm, and means for controlling an electrical circuit with the said multiplied movement.

2. An electrically operated automatic level, comprising a bent tube with a pair of upwardly directed arms, a liquid in said arms free to move under the action of gravity upon tilting of the tube, a diaphragm supported on the tube and in contact with the liquid, mechanical means for multiplying movements of the diaphragm, comprising a finger in contact with the diaphragm, and a step-up system connected with the finger, and means for controlling an electrical circuit with the said multiplied movement.

3. An electrically operated automatic level, comprising a bent tube with a pair of upwardly directed arms a liquid in said arms free to move under the action of gravity upon tilting of the tube, a diaphragm supported on the tube and in contact with the liquid, mechanical means for multiplying movements of the diaphragm, comprising a finger in contact with the diaphragm, rack teeth formed on the finger, and a gear step-up system connected with the rack teeth, and means for controlling an electrical circuit with the said multiplied movement.

4. In an electrically operated automatic level, a bent tube with a pair of upwardly directed arms, a diaphragm supported on the tube, mechanical means conected with said diaphragm for multiplying movements of the diaphragm, and means for controlling an electrical circuit with the said multiplied movement, consisting of a contact finger connecting with the last member of said multiplying system, a plurality of contacts thereon, and stationary means for closing a circuit with the contacts as the contact finger moves.

5. In an electrically operated automatic level, a bent tube with a pair of upwardly directed arms, a diaphragm supported on the tube, mechanical means connected with said diaphragm for multiplying movements of the diaphragm, and means for controlling an electrical circuit with the said multiplied movement, consisting of a contact finger connecting with the last member of said multiplying system, a plurality of contacts thereon, and stationary means for closing a circuit with the contact as the contact finger moves, comprising a tray with an electrical conducting liquid constituting a terminal and engaging by said contact finger.

6. In an electrically operated automatic level, a bent tube with a pair of upwardly directed arms, a diaphragm supported on the tube, mechanical means connected with said diaphragm for multiplying movements of the diaphragm, and means for controlling an electrical circuit with the said multiplied movement, consisting of a contact finger connecting with the last member of said multiplying system, a plurality of contacts thereon, and stationary means for closing a circuit with the contacts as the contact finger moves, said contact finger moving in the arc of a circle.

7. In an electrically operated automatic level, a bent tube with a pair of upwardly directed arms, a diaphragm supported on the tube, mechanical means connected with said diaphragm for multiplying movements of the diaphragm, and means for controlling an electrical circuit with the said multiplied movement, consisting of a contact finger connecting with the last member of said multiplying system, a plurality of contacts thereon, and stationary means for closing a circuit with the contacts as the contact finger moves, said contact finger moving in a straight line.

8. In an electrically operated automatic level, a bent tube with a pair of upwardly directed arms, a diaphragm supported on the tube, mechanical means for multiplying movements of the diaphragm, and means for controlling an electrical circuit with the said multiplied movement, consisting of a contact finger connecting with the last member of said multiplying system, a plurality of contacts thereon, and stationary means for closing a circuit with the contacts as the contact finger moves, comprising a tray with an electrical conducting liquid connected to a terminal and engaging by said contact finger, a damping member being slightly above the contact finger for arresting sudden movement of the finger into the liquid.

9. In an electrically operated automatic level, a bent tube with a pair of upperly directed arms, liquid in said arms so as to move under the action of gravity upon tilting of the tube, a diaphragm supported on the end of the tube and in contact with the liquid, a rack pin substantially vertically slidably supported upon said tube and above said diaphragm and urged in contact therewith, a train of step-up gears with the first gear in mesh with said rack pin, a switch contact finger slidably supported on said tube and in mesh with the last gear of said train of gears and movable substantially in the vertical and down as the rack pin moves up.

10. In an electrically operated automatic level a bent tube with a pair of upperly directed arms, liquid in said arms so as to move under the action of gravity upon tilting of the tube, a diaphragm supported on the end of the tube and in contact with the liquid, a rack pin substantially vertically slidably supported upon said tube and above said diaphragm and urged in contact therewith, a train of step-up gears with the first gear in mesh with said rack pin, a switch contact finger slidably supported on said tube and in mesh with the last gear of said train of gears and movable substantially in the vertical and down as the rack pin moves up, said train of gears being mounted upon brackets supported on a flange on the end of said tube.

11. In an electrically operated automatic level a bent tube with a pair of upperly directed arms, liquid in said arms so as to move under the action of gravity upon tilting of the tube, a diaphragm supported on the end of the tube and in contact with the liquid, a rack pin substantially vertically slidably supported upon said tube and above said diaphragm and urged in contact therewith, a train of step-up gears with the first gear in mesh with said rack pin, a switch contact finger slidably supported on said tube and in mesh with the last gear of said train of gears and movable substantially in the vertical and down as the rack pin moves up, said train of gears being mounted upon brackets supported on a flange on the end of said tube, and a bowl of liquid being mounted upon said flange and beneath said switch contact finger for coaction with the contact finger in the operation of a switch.

In testimony whereof I have affixed my signature.

LEO SICHEL.